United States Patent [19]

Kugler et al.

[11] E Patent Number: Re. 32,160

[45] Reissued Date of Patent: May 27, 1986

[54] COMBINATION ROOFING MATERIAL UNROLLING AND HEAT APPLYING APPARATUS

[76] Inventors: William E. Kugler, 2989 S. Detroit Way, Denver, Colo. 80210; James M. Pacello, 7330 Poppy Way, Golden, Colo. 80401

[21] Appl. No.: 663,069

[22] Filed: Oct. 19, 1984

Related U.S. Patent Documents

Reissue of:

[64] Patent No.: 4,354,893
Issued: Oct. 19, 1982
Appl. No.: 295,734
Filed: Aug. 24, 1981

[51] Int. Cl.[4] ..... B32B 31/26

[52] U.S. Cl. ..... 156/497; 156/499; 156/574; 156/577; 156/579

[58] Field of Search ..... 156/497, 499, 574, 577, 156/578, 579; 118/47; 404/94, 95, 100

[56] References Cited

U.S. PATENT DOCUMENTS

| | | | |
|---|---|---|---|
| 1,278,272 | 9/1918 | Wilson | 156/577 |
| 2,084,625 | 6/1937 | Stebbins et al. | 156/497 |
| 3,097,986 | 7/1963 | Kauer | 156/497 |
| 3,099,582 | 7/1963 | Ongstad et al. | 156/579 |
| 3,146,485 | 9/1964 | Evans et al. | 401/52 |
| 4,087,309 | 5/1978 | Lang | 156/497 |
| 4,204,904 | 5/1980 | Tabor | 156/497 |
| 4,243,468 | 1/1981 | Boyd | 156/577 |

OTHER PUBLICATIONS

"Exact Roofing Torches", Euroroof Ltd., 1/81.

*Primary Examiner*—Caleb Weston
*Attorney, Agent, or Firm*—Sheridan, Ross & McIntosh

[57] ABSTRACT

A combination heat applying and roofing material unrolling apparatus is provided. The apparatus includes a frame assembly and a heating support unit. Connecting means interconnects the frame assembly and a roll rod which engages a roll of the roofing material. Guide means having slots are joined to the connecting means. The slots receive a common pipe of the heating support unit. A plurality of burner elements are connected to the common pipe to emit flames for softening an adhesive layer of the roofing material. The common pipe is adjusted laterally and rotationally with respect to the roll of roofing material to permit application of different heating temperatures to the adhesive layer as the roofing material is unrolled.

14 Claims, 4 Drawing Figures

COMBINATION ROOFING MATERIAL UNROLLING AND HEAT APPLYING APPARATUS

Matter enclosed in heavy brackets [ ] appears in the original patent but forms no part of this reissue specification; matter printed in italics indicates the additions made by reissue.

FIELD OF THE INVENTION

The present invention relates to devices for applying roofing material and, in particular, to an apparatus which applies roofing material to a surface and simultaneously heats an adhesive undercoating of the roofing material to join the roofing material to the surface.

BACKGROUND ART

In applying roofing material to a roof surface of a structure, it is common practice to heat the underside of the roofing material in order to soften an adhesive layer formed thereon. Upon softening to a desired temperature, the roofing material is placed or rolled onto the roof surface. The roofing material primarily provides an impermeable barrier to protect the inside of the structure against the entry of unwanted environment elements.

In one well-known manner of applying heat, a single torch assembly is used to apply a flame to a roofing material adhesive layer. The operator of the torch assembly unrolls the roofing material by means of his hands or feet as the adhesive layer is sufficiently softened. In another relevant system, a roll bar handle is used to move a roll of roofing material while a separate flame emitting or torching apparatus applies heat to the adhesive layer.

The present invention combines heat applying and unrolling features through an interconnecting structure which enables the user to laterally move, rotate, or tilt at an angle the heat or flame applicator with respect to the roll of roofing material in order to provide a desired degree of heat to an adhesive layer.

PRIOR ART STATEMENT

U.S. Pat. No. 2,084,625 to Stebbins et al. discloses an apparatus for heating overlapping edge portions of adjacent sheets of roofing material to cement the edge portions together. The apparatus includes straight bottom edges which rest on the surface of a lower sheet while curved edges support the marginal portion of an overlying sheet. As the operator pushes the apparatus, heat from a gas flame softens a bituminous coating on the upper side of the underlying sheet and on the lower side of the overlying sheet.

U.S. Pat. No. 3,099,582 to Ongstead et al. describes a device for placing an adhesive between tab portions of rows of overlapping roofing shingles. As the device is driven forward, the lifting surface of a wedge passes under and raises each of the shingled tabs in the row so that an adhesive can be applied thereunder. As the device continues to move a lowering surface thereof repositions the shingle to its original placement.

U.S. Pat. No. 3,146,485 to Evans et al. discloses a mastic applying device for simultaneously lifting tabs of shingles and applying the mastic thereunder. As the device is moved, mastic is applied under the tab of the preceeding shingle while the next shingle is lifted.

An apparatus for applying heat to the bottom side of roofing material is also shown in the publication entitled "Exact Roofing Torches" and dated January, 1981. In this publication, a torch trolley is described which includes a number of burners for providing a flame across the underside of a roll of roofing material. The roll of roofing material is unrolled using a roll bar handle which is separate from the torch trolley so that the operator must separately control movement of the roofing material and the torch trolley.

DISCLOSURE OF THE INVENTION

In accordance with the present invention, a roofing material unrolling and flame emitting apparatus is provided for heating the underside of roofing material as the roofing material is placed over a surface. The apparatus includes a frame assembly for use in moving the apparatus. The frame assembly is attached to a connector piece to which a roll rod is joined. The roll rod is positioned through the center cavity of a roll of roofing material. A heating supoort unit having a number of burner elements connected thereto is laterally and rotatably movable with respect to the roll of roofing material. As the apparatus is moved, flames emitted from the burner elements heat the bottom or underside layer of the roofing material so that the roofing material adheres to the surface.

More particularly, the frame assembly of the present invention includes wheels and an axle member interconnecting the wheels. A frame handle is joined to the axle member for engagement by the user of the apparatus. The heating support unit includes a common pipe extending adjacently across from the roofing material roll. The common pipe is inserted into a slot formed above the connector piece. A number of burner elements for emitting a flammable gas are connected to the common pipe. An adjusting handle joined to the common pipe is gripped by the user and enables the user to rotate the common pipe in order to change the position of the burner elements relative to the roofing material. The common pipe is also movable in a lateral direction to adjust the distance between the burner elements and the roofing material. The common pipe is also capable of being slanted or tilted at an angle so that some burner elements are more adjacent the roofing material than other burner elements.

Based on the foregoing description a number of advantages and benefits of the present invention are discerned. A combination unrolling and heat applying device is provided in a single unit to soften the adhesive layer of roofing material as it is unrolled. Burner elements of the heat applicator can be rotated, slanted or moved laterally in at least one slot to quickly adjust the direction of flames and the distance between the flames and the roofing material adhesive layer. As a consequence, the apparatus is readily adjustable for efficient use in various temperatures, wind conditions and altitudes. The heating support unit is moved laterally, pivoted, or tilted at an angle in order to maximize the mixture of gas and oxygen and thereby provide the most efficient flames for softening the adhesive layer since optimum oxygen content depends upon the environment in which the apparatus is being used. Furthermore, the position of the burner elements relative to the roll of roofing material is adjustable for the purpose of removing any undesired moisture which may be present at random locations in the adhesive layer of the roofing material.

Additional advantages of the present invention will become readily apparent from the following discussion taken in conjunction with the accompanying drawings.

DESCRIPTION OF THE PREFERRED EMBODIMENT

Figure 1:
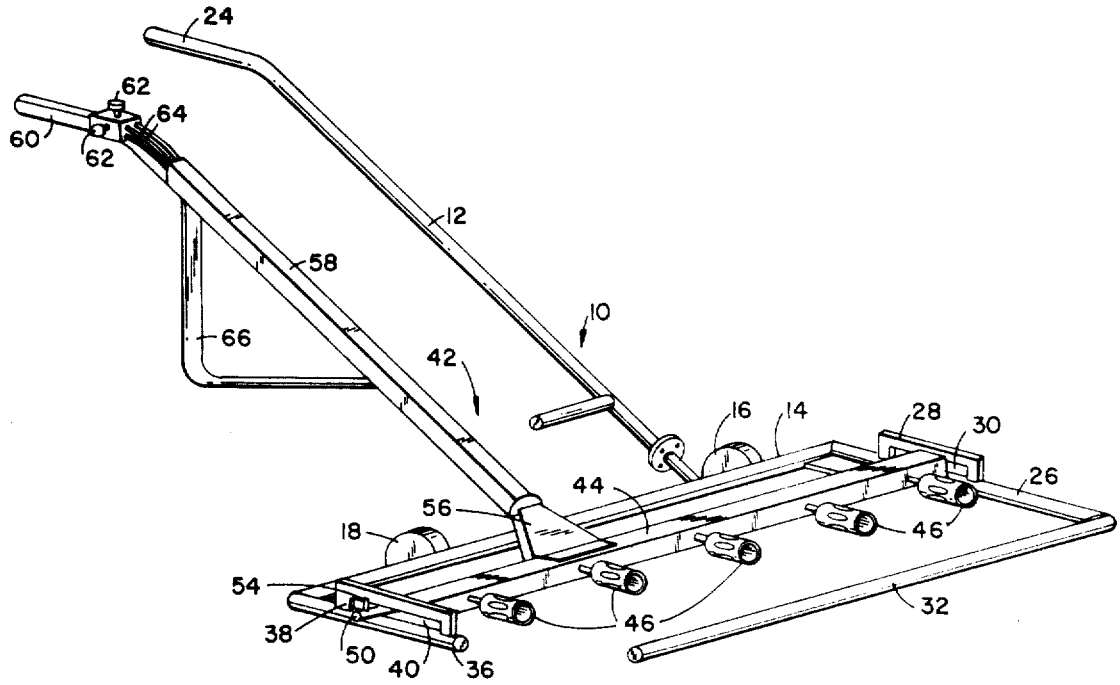
FIG. 1 is a perspective view of the apparatus of the present invention.

In accordance with the present invention, a combination flame emitting and roofing material unrolling apparatus is depicted in FIG. 1. The apparatus of the present invention has particular utility in applying roofing material to a roof or other surface of a building to protect the building against the entry of unwanted elements through the outside surface thereof.

Figure 2:
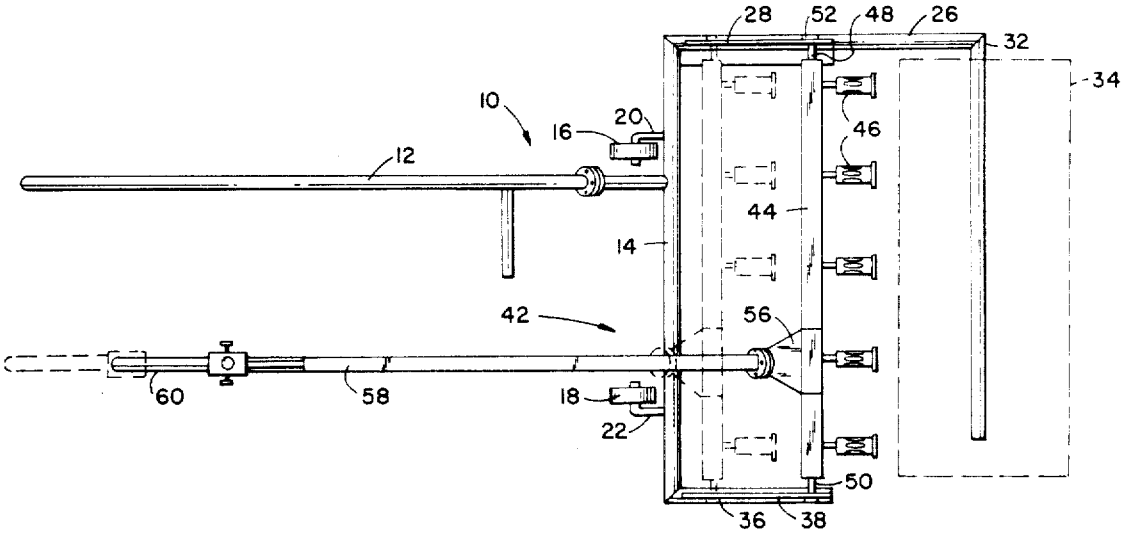
FIG. 2 is a top plan view of the present invention showing uniform, lateral movement of the common pipe and burner element.

The apparatus includes a frame assembly 10 having a frame handle 12 and an axle member 14. The frame assembly 10 also includes a pair of wheels 16, 18. The axle member 14 is supported by the spaced wheels 16, 18. Wheel 16 is joined to the axle member 14 by wheel shaft 20 while wheel 18 is joined to the axle member 14 by wheel shaft 22, as seen in FIG. 2. The wheel shafts 20, 22 extend outwardly away from the axle member 14 to facilitate movement of the frame assembly 10. The frame handle 12 is connected to and offset from the center of the axle member 14 while positioned adjacent the wheel 16. The frame handle 12 extends obliquely from the axle member 14 and includes an upper portion 24 which is formed at an angle with respect to the remaining portions of the frame handle 12 to enable the operator or user of the apparatus to readily grasp the frame handle 12.

Joined to a first end of the axle member 14 is a connector piece 26, which, in the preferred embodiment, is a cylindrical rod. Connector piece 26 extends generally perpendicular to the axle member 14 and in a direction opposite that of the wheel 16, 18 and frame handle 12. A first guide member 28 is attached, by welding or other conventional means, to the upper portion or side of the connector piece 26 and extends vertically away from the connector piece 26. The first guide member 28 has an inverted U-shape and includes a slot 30 formed between the arms of the U-shaped first guide member 28 and the connector piece 26.

Joined to the other end of the connector piece 26 is a cylindrical roll rod 32 which extends generally parallel to the axle member 14 and perpendicular to the connector piece 26. The length of the roll rod 32 is less than the length of the axle member 14 and is adapted to be inserted into the cavity or center opening of a standard roll of roofing material 34, as illustrated in phantom lines in FIGS. 2, 3 and 4.

Joined to a second end, opposite the first end, of the axle member 14 is a connecting member 36. The connecting member 36 extends away from the axle member 14 in the same direction as connector piece 26 and is generally perpendicular to the axle member 14. Connecting member 36 is somewhat less in length than the connector piece 26 to permit easy insertion of the roll rod 32 into the cavity of the roll of roofing material 34 by the operator. Like the connector piece 26, an inverted U-shaped second guide member 38 is attached to the connecting member 36 and extends vertically therefrom. The second guide member 38 also has a slot 40 with the slot 40 being spaced from and in axial alignment with the slot 30.

The apparatus also includes a heating support unit 42. The heating support unit 42 includes a common pipe 44 having a number of generally cylindrically formed burner elements 46 fastened thereto. The burner elements 46 are essentially equally spaced along the longitudinal extent of the common pipe 44 and project toward the roll rod 32 and roll of roofing material 34. Extender rods 48, 50 are connected to opposite ends of the common pipe 44 and extend in axial alignment therefrom. The diameter or width of each of the extender rods 48, 50 is just less than the width of the slots 30, 40 so that the extender rod 48 is received by slot 30 while extender rod 50 is received by slot 40 in order that the heating support unit 42 be supported above the surface by the connector piece 26, connecting member 36 and wheels 16, 18.

Joined to the tip of extender rod 48 is holding pin 52. Holding pin 52 extends outwardly from the extender rod 48 and is perpendicular to the longitudinal extent thereof. In a similar manner, a holding pin 54 extends outwardly from the tip of extender rod 50 and is perpendicular to the longitudinal extent thereof. In order that the slots 30, 40 receive the common pipe 44, the holding pins 52, 54 are positioned so that they are substantially parallel to the slots 30, 40. The extender rods 48, 50 are then inserted into their respective slots 30, 40. Subsequently, the common pipe 44 is rotated so that the holding pins 52, 54 extend vertically adjacent the first and second guide members 28, 38 to hold the common pipe 44 securely in the slots 30, 40. In this position, the burner elements 46 are substantially parallel to the support surface or roof.

The heating support unit 42 also includes a trapezoidal-shaped plate 56 fastened to the common pipe 44 and extending at an oblique angle thereof. An adjusting handle 58 is connected to the plate 56 and terminates in an upper portion 60, which is to be gripped by a hand of the operator.

Disposed intermediate the upper portion 60 and the remaining portions of the adjusting handle 58 are gas valves 62. Each gas valve 62 regulates the flow of a flammable gas from a primary gas line (not shown) to one or more secondary gas lines 64. In one embodiment, there are three gas lines for carrying the flammable gas to one or two of the five burner elements 46. As a result, one or more burner elements may be deactivated or shut-off while other burner elements 46 are emitting heat or a flame for melting or softening the adhesive layer of the roofing material 34.

A support stand 66 is attached to the adjusting handle 58 and is used to support the apparatus above the supporting surface when the apparatus is not being used.

Figure 3:
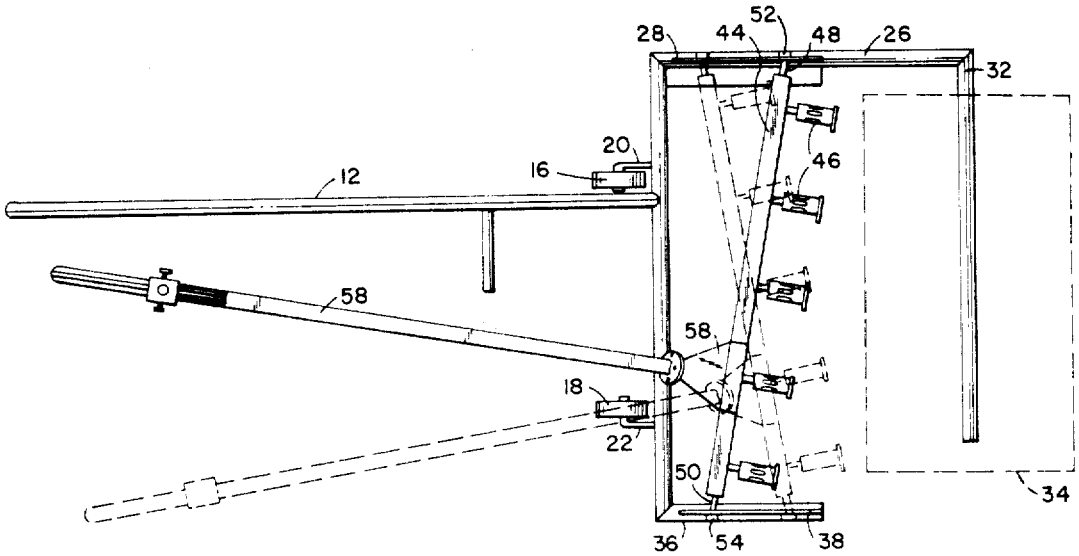
FIG. 3 is a top plan view of the apparatus illustrating the slanting of the burner elements relative to the roll of roofing material.
Figure 4:
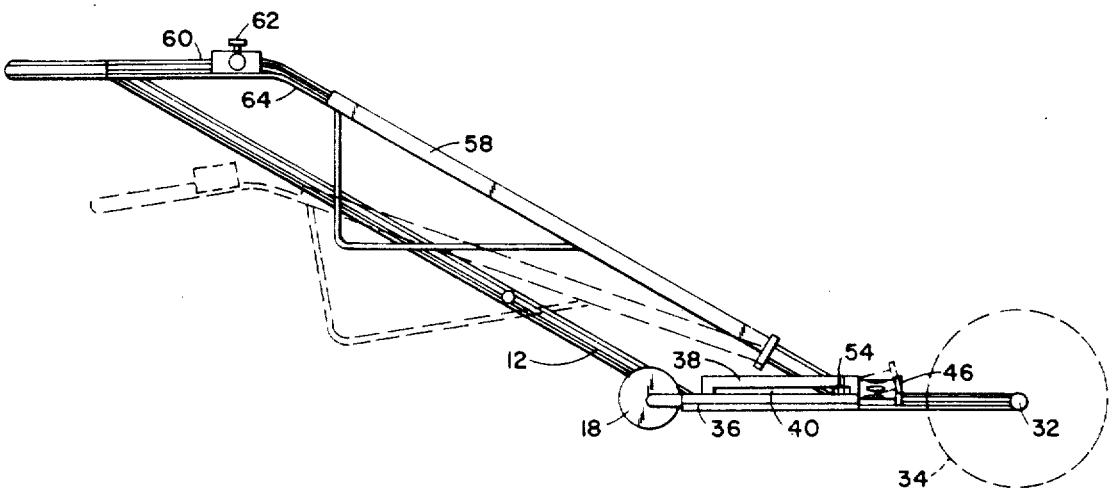
FIG. 4 is a side elevational view of the apparatus illustrating the pivoting of burner elements.

To readily understand the significance of the slots 30, 40 and connector piece 26 and connecting member 36, reference is made to FIGS. 2, 3 and 4. As illustrated in FIG. 2, movement of the burner element 44 in a lateral direction towards or away from the roll of roofing material 34 is accomplished by pushing or pulling on the adjusting handle 58 by the operator. When it is desirable to position the burner elements 46 relatively farther from the roll of roofing material 34, as shown in phantom lines in FIG. 2, the common pipe 44 is moved in the slots 30, 40 away from the roofing material 34 by pulling on the adjusting handle 58. The desired lateral position of the extender rods, 48, 50 in the slots 30, 40 depends upon such factors as the amount of wind present during the placement of the roofing material on the roof and the altitude of the location in which the apparatus is being used. In achieving the most efficient temperature of the ignited gas from the burner elements 46, it is necessary to obtain the optimum mixture of flammable gas and oxygen. The optimum mixture can be obtained by varying the distance between the burner elements 46 and the roll of roofing material 34.

In addition to moving each of the burner elements 46 uniformly in a lateral direction, the burner elements 46 may be slanted or positioned at an inclination relative to the roofing material 34, as depicted in FIG. 3. In this manner of movement, a first end or extender rod 48 or 50 of the common pipe 44 is moved laterally in one of the slots 30, 40 so that the burner elements 46 more adjacent the first end of the common pipe 44 are relatively closer the roofing material 34. The second end or other extender rod 48 or 50 of the common pipe 44 is essentially held stationary in its respective slot 30 or 40 or is moved laterally less than the first end of the common pipe 44. This position of the burner elements 46 provides a non-uniform application of heat or ignited gas to the roll of roofing material 34. This location of the burner elements 46 may be desirable in those instances in which there is a non-uniform moisture content in the adhesive layer of the roofing material 34 and a greater temperature must be applied to this greater moisture-containing portion to enable moisture migration therefrom.

With reference to FIG. 4, considerations similar to those discussed previously may also warrant the pivoting or rotation of the common pipe 44 in the slots 30, 40. During this movement of the common pipe 44, the burner elements 46 are pivoted upwardly or downwardly relative to the roofing material 34 so that flames emitted by one or more burner elements 46 are directed to upper or lower portions, respectively, of the roofing material 34.

In operation, the user of the apparatus inserts the roll rod 32 into the center opening of the roll of roofing material 34. The user opens the appropriate gas valves 62 and ignites the flammable gas exiting the burner elements 46. The user then grips the upper portions 24, 60 of the frame handle 12 and adjusting handle 58 with his hands and pulls the apparatus towards him. As the apparatus is pulled, the flames emitted from the burner elements 46 are directed against the adhesive layer of the roofing material 34 so that the adhesive layer is softened to facilitate adherence thereof to a roof or other surface. As can be appreciated from the previous discussion, the user is able to adjust the position of the burner elements 46 relative to the roll of roofing material 34 as the roofing material is unrolled, depending upon the degree of heat to be applied to the different portions of the roofing material.

In view of the foregoing detailed discussion, it is readily seen that the present invention provides an efficient apparatus for softening an adhesive layer of roofing material while simultaneously unrolling or applying the roofing material to a surface. Most important, the user is able to adjust the direction or position of the heat or flames applied to the roofing material by means of guide members and slots formed therein. In this manner, an optimum mixture of flammable gas and oxygen can be achieved. In addition, non-uniform heating of the roll of roofing material is possible to permit removal of any unwanted moisture from portions of the roofing material as it is unrolled.

Although the present invention has been described with reference to a particular embodiment thereof, it is readily appreciated that variations and modifications can be effected within the spirit and scope of this invention.

What is claimed is:

1. A combination roofing material unrolling and heat applying apparatus, comprising:

frame means;

heating means connected to said frame means, said heating means having a first end and a second end, said heating means adapted to emit a fluid to be ignited;

first means for engaging a roll of the roofing material; and connecting means for interconnecting said frame means and said first means so that the roll of roofing material and said frame means move simultaneously together, said connecting means including guide means which supports said first and second ends of said heating means, said first end of said heating means being movable independently of said second end of said heating means relative to said guide means, said heating means outputting heat for softening an [an] adhesive layer formed on the roofing material while the roofing material is unrolled.

2. An apparatus, as claimed in claim 1, wherein:

said connecting means includes a connector piece having a first end and a second end, said first end being attached to an end of said frame means, and said first means includes a roll rod attached to said second end of said connector piece.

3. An apparatus, as claimed in claim 2, wherein:

said guide means includes a first guide member attached to said connector piece and extending outwardly therefrom, a slot being formed between said first guide member and said connector piece to receive said first end of said heating means, said heating means adapted for movement in a lateral direction and a rotational direction within said slot to vary the position of the ignited fluid with respect to the adhesive layer of the roofing material.

4. An apparatus, as claimed in claim 3, wherein:

said connecting means further includes a connecting member attached to said frame means and said guide means includes a second guide member joined to said connecting member and extending outwardly therefrom, said second guide member being substantially axially aligned with said first guide member.

5. An apparatus, as claimed in claim 1, wherein:

said frame means includes a pair of wheels and an axle member interconnecting said wheels to facilitate movement of the apparatus.

6. An apparatus for unrolling roofing material having an adhesive layer and for applying heat to the adhesive layer during the unrolling of the roofing material, comprising:

frame means having a first end and a second end for use in moving the apparatus;

heating means including common pipe means and a plurality of burner elements connected to said common pipe means for emitting flames to heat the adhesive layer of the roofing material as the roofing material is unrolled, said common pipe means having a first end and a second end;

first means for engaging the roofing material; and connecting means for interconnecting said frame means and said first means so that the roofing material is adapted to be unrolled as the adhesive layer of the roofing material is softened by the flames emitted by said burner elements, said connecting means including guide means for receiving said first and second ends of said common pipe means and for use in adjusting the position of said common pipe means in a lateral direction and a rotational direction, said first end of said common pipe means being movable independently of said second end of said common pipe means in a substantially lateral direction for varying the heating of different portions of the roofing material.

7. An apparatus, as claimed in claim 6, wherein said guide means includes:

a connector piece joined to said first end of said frame means;

a connecting member joined to said second end of said frame means;

a first guide member joined to said connector piece and extending outwardly therefrom;

a second guide member joined to said connecting member and extending outwardly therefrom; and a slot formed between said connector piece and said first guide member and a slot formed between said connecting member and said second guide member, said slots receiving said first and second ends of said common pipe means therein to permit the lateral and rotational movement of said common pipe means with respect to the roofing material.

8. An apparatus as claimed in claim 7, wherein:

said first means includes a roll rod for insertion through an opening formed in a roll of the roofing material.

9. An apparatus, as claimed in claim 6, wherein said frame means includes:

a pair of spaced wheels;

an axle member interconnecting said wheels; and a frame handle connected to said axle member for engagement by the operator of the apparatus.

10. An apparatus for unrolling roofing material having an adhesive layer and for applying heat to the adhesive layer during the unrolling of the roofing material, comprising:

frame means having a first end and a second end and including a frame handle for engagement by the operator of the apparatus;

a connector piece attached to said first end of said frame means and extending in a direction opposite said frame handle;

a first guide member joined to said connector piece and extending outwardly therefrom, an elongated slot being formed between said connector piece and said first guide member;

a connecting member attached to said second end of said frame means and extending in a direction opposite of said frame handle;

a second guide member joined to said connecting member and extending outwardly therefrom, an elongated slot being formed between said connecting member and said second guide member;

common pipe means having a first end and a second end being received in and being separately movable in said elongated slots for lateral and rotational movement therein;

a plurality of laterally spaced burner elements connected to said common pipe means for emitting a flammable gas to heat the adhesive layer:

an adjusting handle connected to said common pipe means for engagement by the operator of the apparatus to laterally and rotationally adjust the position of said burner elements; and a roll rod connected to said connector piece for receiving a roll of roofing material for use in unrolling the roofing material as heat is applied to the adhesive layer.

*11. A combination roofing material unrolling and heat applying apparatus, comprising:*

*frame means;*

*heating means connected to said frame means, said heating means having a first end and a second end, said heating means adapted to emit a fluid to be ignited;*

*first means for engaging a roll of the roofing material; and*

*connecting means for interconnecting said frame means and said first means so that the roll of roofing material and said frame means move simultaneously together, said connecting means including guide means which supports said first and second ends of said heating means, said heating means being movable in said guide means independently of the movement of the roll of roofing material to position said heating means relative to said first means, said heating means outputting heat for softening an adhesive layer formed on the roofing material while the roofing material is unrolled.*

*12. An apparatus, as claimed in claim 11, wherein:*

*said guide means includes a pair of spaced members forming a slot therebetween.*

*13. An apparatus, as claimed in claim 12, wherein:*

*said first end of said heating means is positioned in said slot between said members and said first end is movable in said slot.*

*14. A combination roofing material unrolling and heat applying apparatus, comprising:*

*frame means;*

*heating means connected to said frame means, said heating means having a first end and a second end, said heating means adapted to emit a fluid to be ignited;*

*first means for engaging a roll of the roofing material; and*

*connecting means for interconnecting said frame means and said first means so that the roll of roofing material and said frame means move simultaneously together, said connecting means including guide means which supports said heating means, said heating means being movable in said guide means wherein said heating means is positionable to be non-parallel to said first means, said heating means outputting heat for softening an adhesive layer formed on the roofing material while the roofing material is unrolled.*

* * * * *